UNITED STATES PATENT OFFICE.

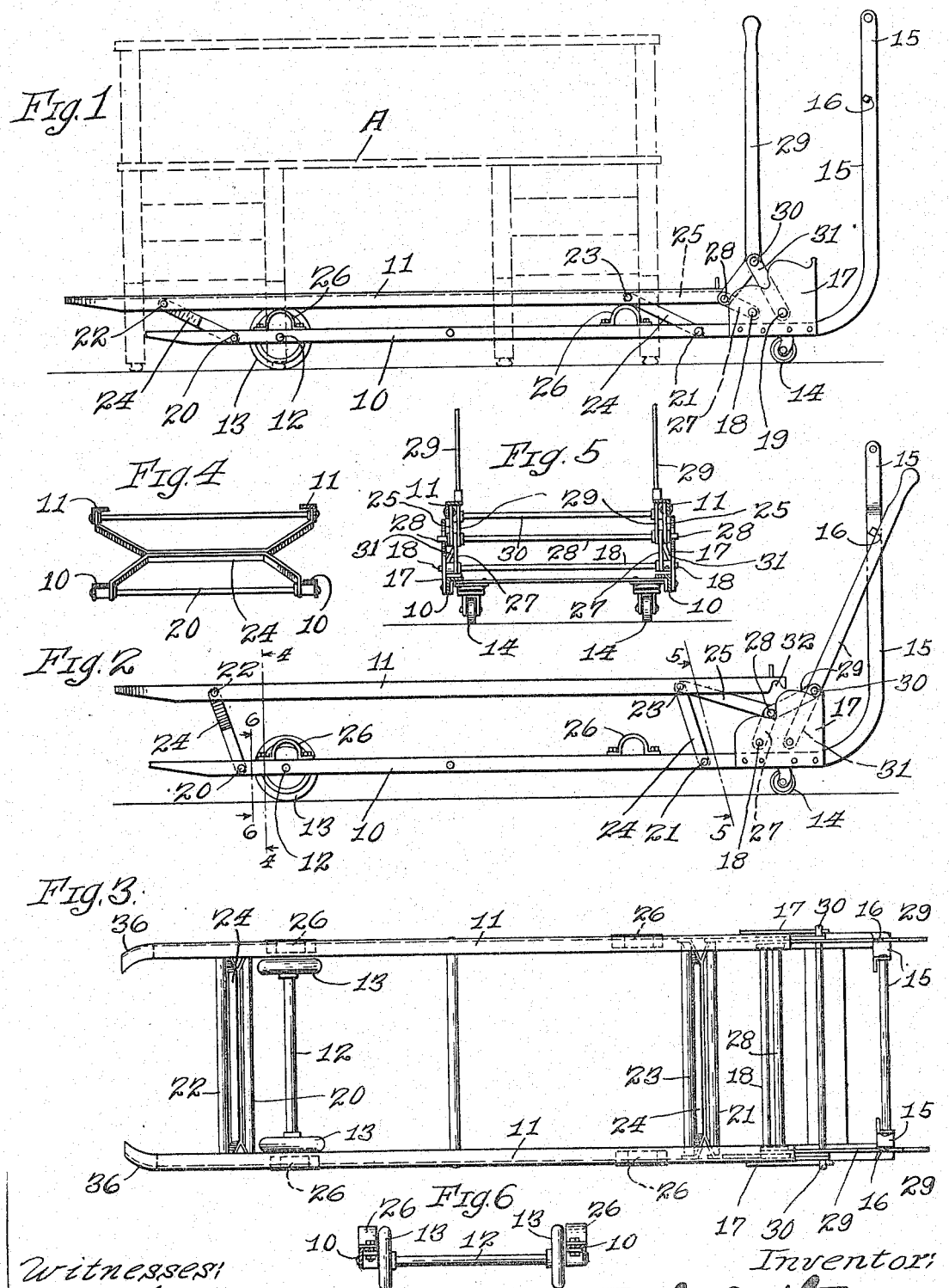

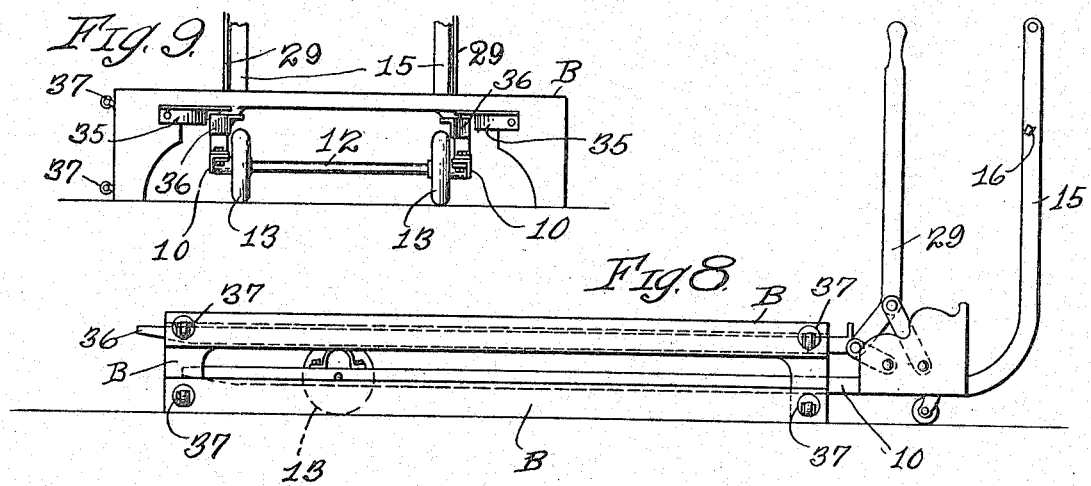
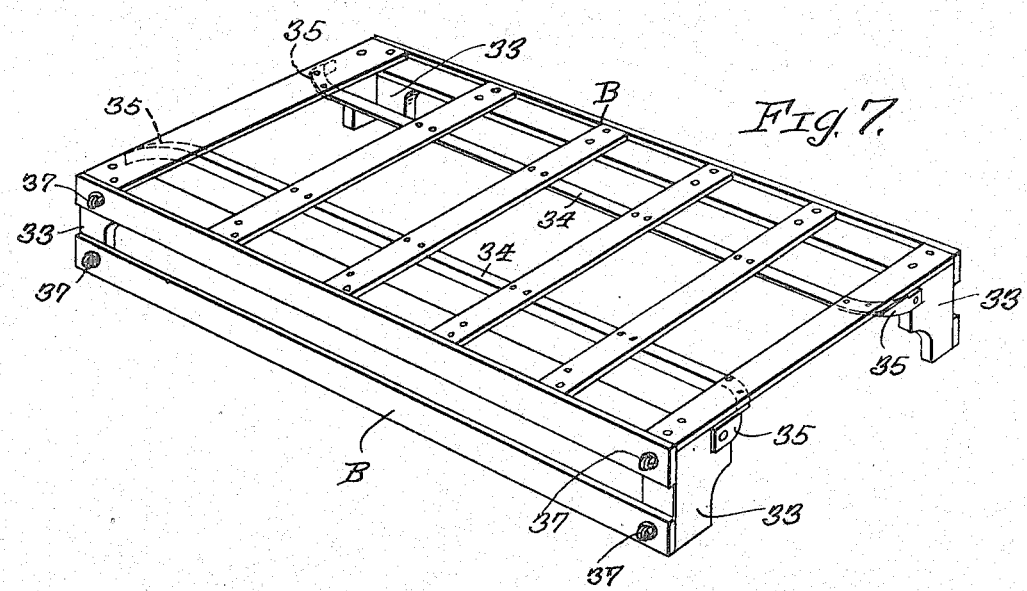
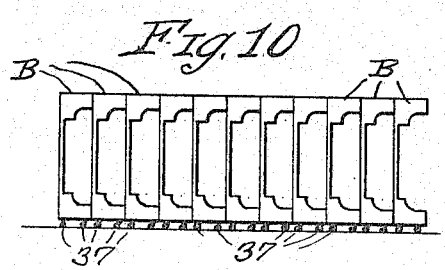

HAROLD G. ANTHONY, OF CHICAGO, ILLINOIS, ASSIGNOR OF FORTY-FIVE ONE-HUNDREDTHS TO ASA Q. REYNOLDS, OF CHICAGO, ILLINOIS.

TRUCK.

1,129,775.   Specification of Letters Patent.   Patented Feb. 23, 1915.

Application filed February 9, 1914. Serial No. 817,421.

*To all whom it may concern:*

Be it known that I, HAROLD G. ANTHONY, a citizen of the United States, residing at Chicago, in the county of Cook and State of Illinois, have invented certain new and useful Improvements in Trucks, of which the following is a specification.

My invention relates to trucks and has for its primary object the provision of an improved truck which shall have improved means for raising and transporting various articles.

With the above and other objects in view, this invention consists substantially in the combination, arrangement, and construction of parts all as hereinafter described, shown in the accompanying drawings, which form a part of this specification and illustrate the preferred embodiment of my invention, and more particularly set forth in the subjoined claims.

Figure 1 is a side elevation of my improved truck, showing it in its lowered position beneath a desk. Fig. 2 is a side elevation of the truck shown in Fig. 1, illustrating its raised position. Fig. 3 is a top plan view of the truck shown in Figs. 1 and 2. Fig. 4 is a view in perspective of one of the brackets forming a part of my improved truck. Fig. 5 is a section taken on line 5—5 of Fig. 2. Fig. 6 is a partial section taken on line 6—6 of Fig. 2. Fig. 7 is a perspective view of a platform forming part of my invention and designed to co-act with the truck in the raising and transporting of articles. Fig. 8 is a side elevation of the truck illustrated in Figs. 1 to 6 inclusive, in combination with the platform shown in Fig. 7. Fig. 9 is a rear elevation of the apparatus shown in Fig. 8, with parts broken away. Fig. 10 shows a number of the platforms of Fig. 7 illustrated in the position which they occupy when stored.

Reference numeral 10 indicates the lower frame of my improved truck, and 11 the upper frame.

Adjacent its forward end the lower frame 10 is provided with an axle 12 and wheels 13, as is best illustrated in Fig. 6. Adjacent its rearward end the lower frame 10 is provided with swiveled casters 14, and at its extreme rearward end the frame 10 bears an approximately vertical upwardly extending steering frame 15. Upon each side of the steering frame 15 is secured a hook or stud 16 for engagement with parts to be described.

The frames 10 and 11 are preferably constructed of angle bars, as shown in Figs. 4, 5, and 6. Adjacent the rearward end of the frame 10 two pivot plates 17 are secured, extending upwardly from the frame, and positioned on opposite sides thereof. These plates are braced by means of a forward cross bar 18 and a rearward cross bar 19, these cross bars being approximately in the same horizontal plane, parallel to each other and at their ends engaging suitable apertures provided in the pivot plates 17. The lower frame 10 is provided with a forward frame cross bar 20 and a rearward frame cross bar 21, and the upper frame 11 is similarly provided with a forward frame cross bar 22 and a rearward frame cross bar 23. Two brackets 24 of equal length connect the lower and upper frames, their lower ends being respectively pivoted to the forward frame cross bar 20 and the rearward frame cross bar 21, while their upper ends are respectively pivoted to the forward frame cross bar 22 and the rearward frame cross bar 23, the two brackets 24 lying in parallel planes. The upper frame 11, by means of the brackets 24, may be raised or lowered with respect to the lower frame 11, while remaining at all times parallel thereto. The upper and lower frames are approximately of equal size, and the lower frame carries four suitably arranged projections 26 for limiting the downward movement of the frame 11 and for supporting it in its lowermost position.

Means for raising the upper frame 11 from its lowermost position, illustrated in Fig. 1, to its elevated position, shown in Fig. 2, are embodied in the following described mechanism: A connecting link 25 is pivoted at its forward end upon the cross bar 23, the mechanism now being described being duplicated on opposite sides of the truck. A pivot bar 28 is carried by the rearward ends of the connecting links 25 and joins them. A short forward link 27, pivoted at its lower end to the forward cross bar 18, has its opposite end pivoted upon the pivot bar 28. An operating handle 29, preferably in the form of a bell crank, has its lower end pivoted upon the pivot bar 28, the lower arm of the handle being slightly longer than the link 27, and the part of the handle grasped by the operator being relatively long and extending upward from the angle of the handle any suitable distance. The mechanism for raising the upper frame 11 being duplicated on opposite sides of the truck, it is obvious that there are two operating handles 29; these handles have their angles joined by a pivot bar 30, which extends from the angle of one handle to the angle of the other handle, and a long rearward link 31 has its lower end pivoted to the rearward cross bar 19, and its upper end in pivotal engagement with the pivot bar 30. As shown in Fig. 2, the rearward end of each of the angle bars forming the sides of the upper frame 11 is notched as at 32 for engagement with the pivot bar 28. Such engagement is had when the upper frame 11 is in its lowermost position, and this engagement assists during the first part of the elevating operation, though during the process of elevating the upper frame 11, the engagement between the pivot bar 28 and the notched end 32, is broken. At A is indicated a desk or other object desired to be moved, and which is spaced from the floor by means of legs a distance sufficient to permit the truck to be rolled beneath it, the truck being in its lowered position.

In the operation of my invention the truck is rolled beneath the object A, the upper frame 11 being in its lowermost position, and the operating handles 29 are pulled toward the steering frame 15. This action results in an adjustment of the upper frame 11 from the lowered position illustrated in Fig. 1, to the raised position shown in Fig. 2, and when the elevating process has been completed, the operating handles 29 are hooked behind the studs 16, thereby locking the upper frame in its elevated position during transportation of the article A. Assuming the truck to be in the lowered position illustrated in Fig. 1, the above described pull upon the operating handle will cause the pivot bar 30 to act as a fulcrum for the operating handle, while at the same time it oscillates backwardly upon the rearward cross bar 19, the load upon the upper frame 11 being carried upon the extreme lower end of the operating handle and by the connecting link 25, upon which a direct pull is exerted. The initial moving of the upper frame 11 from its lowermost position is assisted by the engagement between the pivot bar 28 and the notch 32. During the elevating process the brackets 24 and the links 27 and 31 oscillate rearwardly about their lower end pivots, and the action of the elevating apparatus is such as to decrease the exertion required to elevate the upper frame 11 and the article A, as the operating handle 29 approaches the steering frame 15. As the upper frame 11 rises it contacts with the bottom of the object A and lifts it from the floor, and when the elevating process is complete, the operating handles are hooked behind the studs 16 and the weight of the article rests entirely upon the truck, by means of which it may be rolled wherever desired.

A modification of my invention is illustrated in Figs. 7 to 10 inclusive wherein is shown a removable platform B, which forms a part of my invention and is constructed for coaction with the truck above described. This platform is provided with legs 33 and is adapted to be centrally positioned longitudinally upon the truck frame 11. For convenience in so positioning the platform and truck, the platform is provided with guide bars 34, preferably constructed of angle bar and outwardly turned at their ends 35, the guide bars being parallel and properly spaced to admit of their engagement with the upper frame 11 of the truck. Preferably the forward ends of the upper frame 11 are bent toward each other, as at 36 (see Fig. 3) for coöperation of the truck and the guide bars 34. The height of the platform B is such that the guideways 34 are at a suitable distance from the floor for engagement with the upper frame 11 in its lowermost position. The sides of the truck B are constructed at right angles to its upper weight carrying surface and are provided with casters 37. For the purpose of storage the platforms may be turned upon their sides and rolled into the compact relation illustrated in Fig. 10, wherein they occupy a very small space.

In the use of the modified form of my invention the object A may be supported and stored upon the platform B, and when it is desired to move the object the truck may be positioned beneath the platform and the platform and object elevated from the floor, whereupon the operating handles 29 are locked behind the studs 16 and the platform and object readily transported.

In the accompanying drawings and in the foregoing description is set forth the preferred embodiment of my invention, but it is obvious that one skilled in the art may make modifications thereon without departing from the spirit of the invention.

I claim:

1. In a truck, the combination of a lower frame having roller contact with the floor, an upper frame movably joined to and supported by the lower frame, and means for raising and lowering the upper frame comprising an operating handle, two links having their lower ends in spaced relation and pivoted upon the lower frame and their upper ends in spaced relation and pivoted to the operating handle, and a connecting link pivoted at one end to the upper frame and at the other end to the point upon the operating handle at which one of said links is pivoted.

2. In a truck, the combination of a lower frame having roller contact with the floor, an upper frame, means connecting the upper and lower frames for movement with respect to each other and for maintaining the frames parallel during said movement, and means for raising and lowering the upper frame with respect to the lower frame comprising a short forward link and a long rearward link, the lower ends of said links being spaced from each other, and pivoted to the lower frame, there being duplicate links on opposite sides of the truck, an operating handle for each side of the truck, a pivoted bar to the ends of which the lower ends of the operating handles and the upper ends of the short forward links are pivoted, the upper ends of said long rearward links being pivoted to the respectively adjacent operating handles at points equidistant from and above said pivot bar, and connecting links, one on each side of the truck, the rearward ends of which are pivoted to the pivot bar and the forward ends of which are pivoted to the upper frame, the rearward end of said upper frame being notched for engagement with said pivot bar.

3. In a truck, the combination of a lower frame having roller contact with the floor, an upper frame, means movably joining the upper frame to the lower frame for support thereby and for maintaining the frames parallel during their relative movement, and means for raising and lowering the upper frame comprising a short forward link and a long rearward link, the lower ends of said links being spaced from each other and pivoted to the lower frame, said links being duplicated on opposite sides of the truck, an operating handle on each side of the truck, a pivot carried by the lower end of each operating handle and to which the upper ends of the adjacent short forward links are pivoted, the upper ends of said long rearward links being pivoted to the respectively adjacent operating handles in spaced relation to said pivot bar and thereabove, and connecting links, one on each side of the truck, having their forward ends pivoted to the upper frame and their rearward ends pivoted to the lower ends of the adjacent operating handles and to the upper ends of the adjacent short forward links, the rearward end of said upper frame having engagement at each side of the truck with the pivot which is common to the connecting link, the short forward link and the operating handle while the upper frame is in and adjacent to its lowermost position.

In testimony whereof I have signed my name to this specification, in the presence of two subscribing witnesses, on this 6th day of February, A. D. 1914.

HAROLD G. ANTHONY.

Witnesses:
HAROLD G. ROCKWELL,
CHARLES H. SEEM.